June 10, 1947. J. F. BRUNDAGE 2,421,772
DISK HARROW WITH TRANSPORT MEANS
Filed Oct. 7, 1943 3 Sheets-Sheet 1

Inventor
J. F. Brundage
W. Gerdes
by
Attorney

June 10, 1947.  J. F. BRUNDAGE  2,421,772
DISK HARROW WITH TRANSPORT MEANS
Filed Oct. 7, 1943  3 Sheets-Sheet 2

Inventor
J. F. Brundage
by
Attorney

Patented June 10, 1947

2,421,772

UNITED STATES PATENT OFFICE 2,421,772

DISK HARROW WITH TRANSPORT MEANS

John F. Brundage, Oxnard, Calif., assignor to Allis-Chalmers Manufacturing Company, Milwaukee, Wis., a corporation of Delaware Application October 7, 1943, Serial No. 505,275

33 Claims. (Cl. 55—73)

The invention relates to earth working implements, and it is concerned more specifically with the transportation of an implement, such as a disk harrow, from one place of operation to another.

The principal object of the invention is to provide an implement which will satisfactorily perform operations in conjunction with the maintenance and repair of military roads within the combat area. More specifically, it is an object of the invention to provide an implement of the mentioned character in the form of a disk harrow which is equipped with integral transporting means so that it can be moved rapidly in convoy.

Another object of the invention is to provide a disking implement which may be operated, by drawing it in one direction, to cover a relatively wide strip of land, and which may be readily adjusted to an inoperative position in which it may be drawn in another direction, and in which its over-all width, transversely of said other direction, is relatively small so that it may pass wherever a tractor drawing it in said other direction can pass.

Another object of the invention is to provide an improved transport wheel arrangement for earth working implements of the folding gang type.

A further object of the invention is to provide an improved angle set mechanism for disk harrows and like implements of the tandem gang type.

A still further object of the invention is to provide improved hitch means for implements of the folding gang type.

The foregoing and other objects and advantages of the invention will be more fully apparent from the following description of a preferred embodiment of the invention shown in the accompanying drawings. Referring to the drawings, in which like reference characters designate the same or similar parts in the various views:

Figures 1, 10:
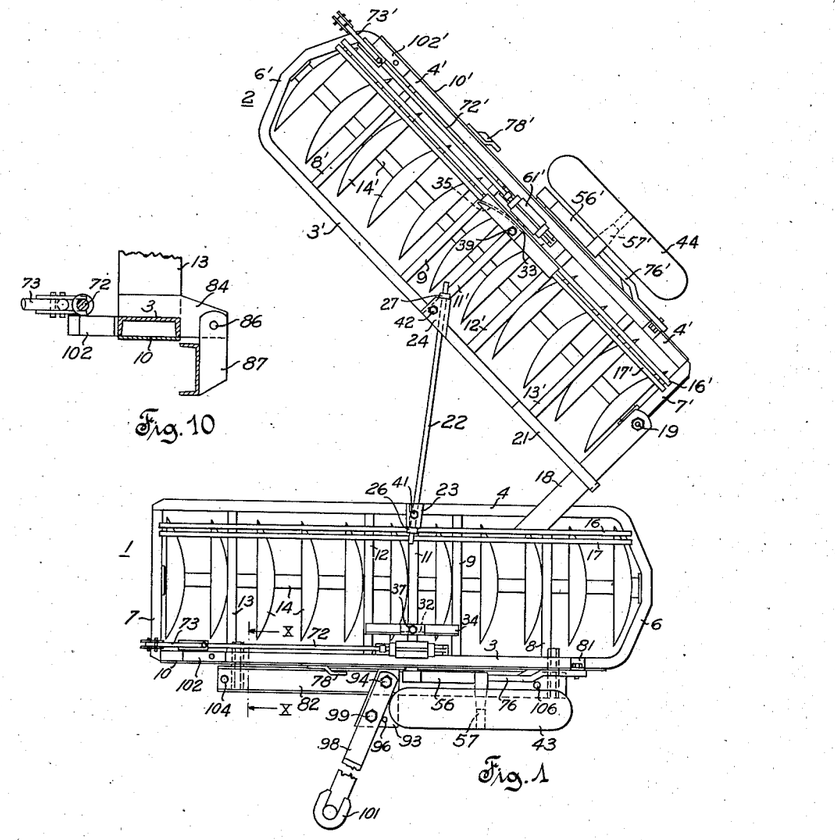
Fig. 1 is a top view of a tandem disk harrow in open position.
Fig. 10 is an enlarged sectional view on line X—X of Fig. 1.
Figure 2:
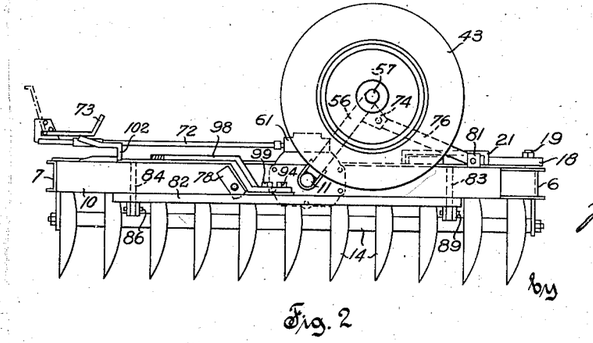
Fig. 2 is a front view of the harrow shown in Fig. 1.
Figures 5, 6, 7, 8:
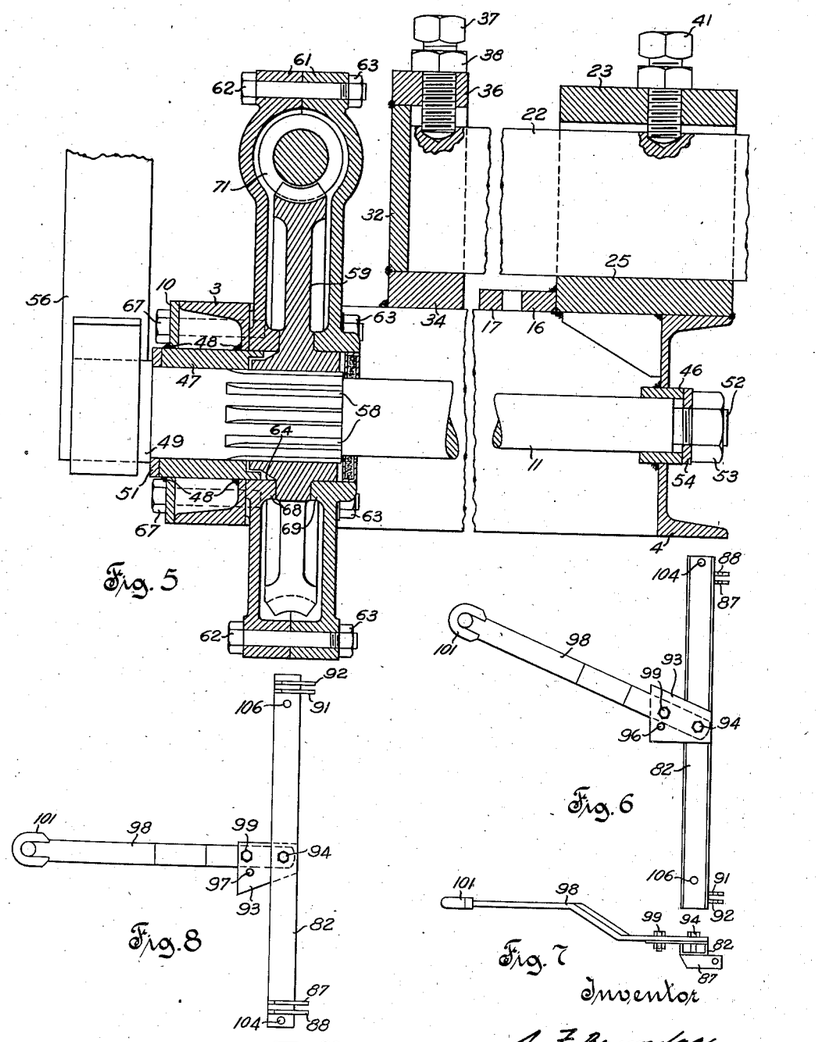
Fig. 5 is an enlarged sectional view on line V—V of Fig. 3.
Fig. 6 is an enlarged top view of an adjustable hitch assembly forming part of the harrow shown in Fig. 1, Fig. 6 showing the hitch assembly adjusted to the same position as shown in Fig. 1.
Fig. 7 is a side view of the hitch assembly shown in Fig. 6.
Fig. 8 is a top view showing the hitch assembly adjusted to the same position in which it is shown in Fig. 3.

Front and rear assemblies of the harrow are generally denoted in Figs. 1 and 2 by the reference characters 1 and 2. A forward frame channel 3 of the front assembly and a rearward frame channel 4 are connected at the right and left ends thereof by end pieces 6 and 7, respectively, and cross members 8, 9, 12 and 13 are rigidly connected with the channels 3 and 4 intermediate the end pieces 6 and 7, the whole forming a rigid frame section of the front assembly. A plate 10 extends all the way across the front face of the channel 3, upper and lower portions of the plate 10 abutting the flanges of the channel 3 as shown in Fig. 5. A gang of axially alined disks 14 forming a front tool unit is suitably mounted on the front frame section for rotation on an axis extending parallel to the forward and rearward frame channels 3 and 4. Also rotatably mounted on the forward frame section is a shaft 11, which extends at right angles to the axis of rotation of the disk gang 14, the shaft 11 forming part of a transport mechanism which will be described in detail hereinbelow.

The rear assembly of the harrow comprises a frame section similar to the frame section of the front assembly, forward and rearward frame channels of the rear frame section being denoted by the reference characters 3' and 4', and the channels 3' and 4' are connected by end pieces 6', 7' and by intermediate cross members 8', 9', 12' and 13'. A plate 10' corresponding to the plate 10 extends across the rear face of the channel 4'. A rearward gang of axially alined disks 14' forming a rear tool unit is suitably mounted on the rear frame section for rotation about an axis extending parallel to the frame channels 3' and 4', the disks 14' being reversed relative to the disks 14, as usual in disk harrows of the tandem gang type. A shaft 11' corresponding to the shaft 11 is rotatably mounted on the rear frame section at right angles to the axis of rotation of the disk gang 14'.

A pair of parallel strap irons 16 and 17 are secured on top of the forward frame section for supporting disk scrapers, not shown, and a similar pair of strap irons 16' and 17' are mounted on top of the rearward frame section.

Figure 3:
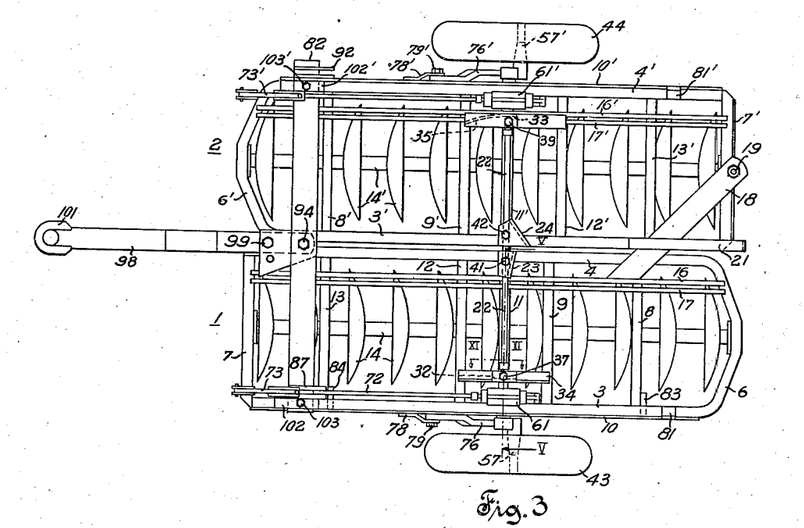
Fig. 3 is a top view of the same harrow which is shown in Figs. 1 and 2, but showing the harrow in closed position.

A bracket arm 18 is rigidly secured to the front frame section on top of the rearward frame channel 4 and intermediate cross member 8, the bracket arm being preferably welded to the channel 4 and cross member 8 and also to the strap iron 16. The bracket arm extends horizontally and rearwardly from the front frame section in a slanting position toward the right, and it is connected at its rear end to the rear frame section by a vertical pivot bolt 19 which is suitably mounted in a vertical position on the right end piece 7' of the rear frame section. Secured to the forward frame channel 3' of the rear frame is a guide strap 21 for the bracket arm 18, the guide strap and the upper surface of the frame channel 3' cooperating with the bracket arm 18 to stabilize the rear frame in a horizontal position. The portion of the guide strap overlying the bracket arm 18 is of sufficient length so as not to impede relative pivotal movement of the front and rear frame sections about the center of the pivot bolt 19 from their open position in which they are shown in Fig. 1, to their closed position in which they are shown in Fig. 3, and vice versa.

Figures 4, 11, 12:
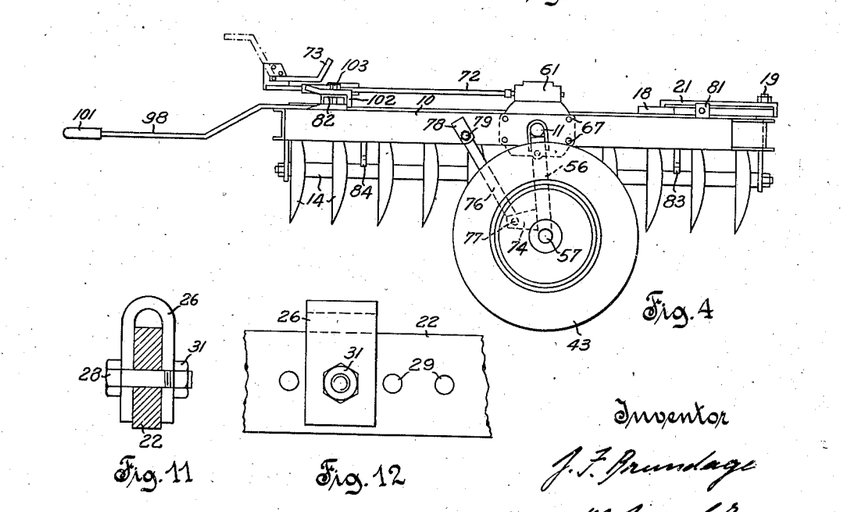
Fig. 4 is a side view of the harrow shown in Fig. 3, Fig. 4 being taken in the same direction as Fig. 2.
Fig. 11 is an enlarged sectional view on line XI—XI of Fig. 3.
Fig. 12 is a side view of the parts shown in Fig. 11.

Relative pivotal movement of the front and rear frame sections about the pivot bolt 19 in opening direction beyond the open position in which they are shown in Fig. 1 is prevented by an angle set mechanism comprising a horizontal control bar 22, guide brackets 23 and 24 for the bar 22, and adjustable stop collars 26 and 27 on the bar 22. The bar 22 is of rectangular cross-section, as shown in Fig. 11, and it is set on edge so as to present horizontal top and bottom surfaces of relatively narrow width and vertical side surfaces of relatively large width. The stop collar 26 consists of a U-clip straddling the bar 22, and a bolt 28 is passed through registering holes of the U-clip and through one of a plurality of holes 29 in the bar 22 so that the clip may be moved to different positions longitudinally of the bar 22. A nut 31 on the bolt 28 is drawn up against the U-clip to clamp it upon the bar 22. The stop collar 27 is similarly constructed and adjustable longitudinally of the bar 22. The control bar 22 is thus provided with a pair of transverse stop members connected with and projecting from said bar at longitudinally spaced portions, respectively, of the latter.

The guide bracket 23 has the shape of an open-ended tapered box, the bottom 25 of which is rigidly secured, as by welding, to the channel 4 of the front frame, as shown in Fig. 5. Opposite plate members forming side walls of the box are disposed at opposite sides of the bar 22, as shown in Fig. 1, the left side wall extending in a vertical plane at substantially right angles to the frame channel 4, and the right side wall extending in a vertical plane at an angle relative to the left side wall so that the right side wall diverges rearwardly and to the right from the left side wall. The front edges of the side walls extend vertically in relatively close proximity to each other so that they may be engaged by the legs of the U-clip 26, and the rear edges of the side walls are spaced from each other a sufficient distance to permit horizontal angular displacement of the bar 22 relative to the front frame section. The right and left side walls of the stop 23 are connected by a top plate overlying the bar 22, the latter being freely slidable longitudinally within the space between the diverging side walls and the parallel top and bottom walls of the box.

The guide bracket 24 is similar in construction to the guide bracket 23, but of somewhat different shape. The box forming the bracket 24 is rigidly secured to the channel 3' of the rear frame unit and it has a vertical side wall at the left side of the bar 22, which extends at substantially right angles to the channel 3'. The other side wall of the box forming the bracket 24, that is, the one at the right side of the bar 22 diverges forwardly and to the right from the left side wall at an angle which is larger than the angle between the side walls of the box forming the bracket 23. The spacing between the rear edges of the side walls, at the bracket 24 corresponds to the leg spacing of the U-clip forming the stop collar 27 so that the latter will cooperate with the bracket 24 in the same manner in which the stop collar 26 cooperates with the bracket 23. A top plate overlying the bar 22 connects the side walls of the box forming the bracket 23, and the bar is freely slidable longitudinally within the space between the top and bottom walls and the diverging side walls of said box. The diverging relation of the side walls at the bracket 24 also permits horizontal angular displacement of the bar 22 relative to the rearward frame section.

It will be noted that the brackets 23 and 24 cooperate with the bar 22 carrying the stop collars 26 and 27, at predetermined distances, respectively, from the center of the pivot bolt 19, and that the bar is mounted on the forward and rearward frame sections for limited sliding movement and angular displacement relative thereto so as to determine the open position of the frame sections in which they are shown in Fig. 1.

Abutments 32 and 33, engageable with the front and rear ends respectively, of the bar 22 are located on the forward and rearward tool units in predetermined positions so as to be spaced from the ends of the bar while the tool units are in open position, as shown in Fig. 1, and so as to contact the ends of the bar while the tool units are in closed position as shown in Fig. 3. Referring to Fig. 5, the forward abutment 32 consists of a vertical plate member which is welded to a base plate 34, the base plate being mounted on top of the cross members 9 and 12 of the front frame as shown in Fig. 1. In the closed position of the harrow, as shown in Fig. 3, the front end of the bar 22 contacts the vertical plate member 32 in the region above the shaft 11. A top plate 36 is secured to the plate 32 for mounting a set screw 37 which may be drawn up against the top surface of the bar 22, the front end of the bar having a suitable recess in its top surface for reception of the lower end of the set screw 37. A lock nut 38 on the set screw 37 serves to retain the set screw in position when it is engaged with the bar 22, or after the set screw has been backed up to release the bar 22.

The rearward abutment 33 is similar in construction to the forward abutment 32, in that it comprises a base plate, a vertical plate, and a top plate, the base plate of the rearward abutment being secured on top of the cross members 9' and 12' of the rearward frame section. The abutment 33 extends in the region above the shaft 11', but the vertical plate affording the abutment 33 is substantially longer, in the direction transversely of the shaft 11', than the vertical plate affording the abutment 32. From the region above the shaft 11' where the vertical plate affords the abutment 33, the plate extends to the left, as shown in Figs. 1 and 3, and it is curved to present an arcuate guide surface 35 for engagement with the rear end of the bar 22 during closing movement of the harrow, as explained more fully hereinbelow. A set screw 39 similar to the set screw 37 is mounted on the top plate of the rearward abutment for engagement with the top surface of the bar 22 at the rear end of the latter.

Assuming that the forward and rearward frame sections are moved relative to each other in closing direction from the open position in which they are shown in Fig. 1, such movement will cause the brackets 23 and 24 to approach each other, and it will also cause a shortening of the distance between the abutments 32 and 33. While the brackets 23 and 24 approach each other the frictional engagement of one of them with the bar 22 may impede longitudinal sliding movement of the bar relative thereto to a greater extent than the frictional engagement of the bar with the other bracket impedes longitudinal sliding movement of the bar relative to said other bracket. If the greater impediment exists at the bracket 23, the bar will not slide longitudinally relative to said bracket until the arcuate guide surface 35 at the left side of the rearward abutment 33 engages the rear end of the bar 22. Continued closing movement of the harrow will then cause forward sliding movement of the bar 22 relative to the bracket 23, and at the same time the rear end of the bar will slide to the right along the arcuate guide surface 35 into its final position opposite to the abutment 33. The front end of the bar moves forwardly and to the right toward the region above the shaft 11 while the rear end of the bar slides along the arcuate guide surface 35 toward the region above the shaft 11'. When the frame sections arrive in their closed position further movement in closing direction is prevented by contact of the abutments 32 and 33 with the forward and rearward ends, respectively, of the bar 22. The curved portion of the vertical plate which forms the arcuate guide surface 35 represents means on one of the frame sections adapted to cooperate with the bar 22 for moving opposite end portions of said bar into predetermined positions relative to the abutments 32 and 33 upon swinging movement of the frame sections from open into closed position.

Referring to Fig. 3, it will be noted that in the closed position of the harrow the cross bar 22 extends at right angles to the front and rear frame bars of the front assembly and also at right angles to the front and rear frame bars of the rear assembly. The arrangement is further such that in the closed position of the harrow the bar 22 serves as a bracing connection between the tool units substantially midway between their ends. In order to enhance said bracing function of the bar 22, a pair of set screws 41 and 42 similar to the set screws 37 and 39, are mounted on top plates of the brackets 23 and 24, repectively. After the harrow has been moved into closed position, all set screws may be drawn up against the bar 22, and the latter will therefore be securely connected with the front and rear frame sections, for holding the frame sections in closed position not only against horizontal swinging movement about the bolt 19 but also against vertical movement relative to each other.

Transport wheels 43 and 44 are mounted, respectively, on the front and rear frame sections to permit movement of the harrow in closed position from one place of operation to another. Referring to Fig. 5, the shaft 11 has a bearing 46 on the rear frame channel 4, and a bearing 47 on the front frame channel 3 of the forward frame section. The bearings 46 and 47 are positioned in alined holes of the frame channels 4 and 3, respectively, and the bearing 47 has a welded connection 48 with the web of the frame channel 3 and with the plate 10. The bearing 46 is likewise held in place by welding. A head 49 is formed on the shaft 11' outside of the front frame, and a thrust washer 51 is interposed between the head 49 and the bearing 47. The other end of the shaft 11 has a threaded stud 52 which carries a nut 53, and a thrust washer 54 is interposed between the nut 53 and the bearing 46. The nut 53 is adjusted so that the shaft 11 will be freely rotatable in the bearings 46 and 47 without appreciable axial play.

Rigidly secured to the head 49 of the shaft 11 is an arm 56 (see Figure 1), and a stub axle 57 is rigidly secured to the free end of the arm 56, and extends at right angles to the axis of rotation of the disk gang 14. The wheel 43 is mounted by suitable bearings, not shown, on the axle 57 for rotation about the axis of the latter.

The wheel 43 is adjustable up and down relative to the front frame by means of a mechanism which is constructed as follows. Referring to Fig. 5, the shaft 11 has a splined portion 58 at the inner side of the bearing 47, and a worm wheel 59 has an internally splined hub in engagement with the splined shaft portion 58. The worm wheel 59 is thus non-rotatably connected with the shaft 11 for axial sliding movement relative thereto. A housing 61 enclosing the wheel 59 is made in two sections which are secured together by a circumferential series of bolts 62, the bolts having nuts 63 which are drawn up to secure the housing sections together. The housing section adjacent to the bearing 47 has a bore 64 concentric with the bearing 47, and the housing is centered on the bearing 47 by means of an extension of the bearing which is press-fitted into the bore 64. The plate 10 has a number of holes for the reception of cap screws 67, and the web of the channel 3 has a corresponding number of holes registering with the holes in the plate 10. The housing 61 has a series of tapped holes for the reception of the threaded ends of the cap screws 67, and the cap screws 67 are tightened to secure the housing 61 against axial displacement relative to the frame of the front tool unit. The worm wheel 59 is fitted between annular shoulders 68 and 69 of the gear housing 61 without appreciable axial play, and when the housing 61 is secured against axial movement by means of the cap screws 67 the worm wheel 59 is likewise secured against axial movement. The splined connection between the shaft 11 and the worm wheel 59 permits axial adjustment of the shaft relative to the bearings 47, 46 by means of the nut 53 while the worm wheel 59 remains in its axially fixed position relative to the frame. The bearing 47 and the housing 61 are mounted on the frame independently of each other, that is, the housing may be removed without removing the bearing, and the shaft 11 has a load bearing connection with the frame through the bearing 47 independently of the housing 61.

A worm element 71 in mesh with the worm wheel 59 is suitably mounted in the upper part of the gear housing 61, and a shaft 72 for rotating the worm 71 extends from the housing 61 as shown in Figs. 1 and 3. A crank 73 is foldably mounted on the end of shaft 72 remote from the housing 61, and it is swingable from a folded position, shown in full lines in Fig. 4, into a cranking position, shown in dash-dotted lines in said figure. By turning the crank 73 in one direction, when it is adjusted to its cranking position, the wheel 43 may be moved from the transport position in which it is shown in Fig. 4 in to the elevated position in which it is shown in Fig. 2, and by turning the crank 73 in the opposite direction the wheel 43 may be moved from the elevated position in which it is shown in Fig. 2 into the transport position in which it is shown in Fig. 4.

Referring to the wheel 44 of the rear assembly, the mounting of this wheel corresponds to the mounting of the wheel 43 which has been described hereinbefore. That is, the wheel 44 is rotatably mounted on a stub shaft 57' which is carried on arm 56' secured to the shaft 11'. The mounting of the shaft 11' on the rearward frame section corresponds to the mounting of the shaft 11 on the forward frame section, a bearing corresponding to the bearing 47 being mounted on the frame channel 4' and plate 10'. The shaft 11' may be rotated by a worm and wheel mechanism corresponding to the worm and wheel mechanism 71, 59 shown in Fig. 5, the housing for the worm and wheel mechanism of the rear assembly being denoted by the reference character 61', and the worm operating shaft by the reference character 72'. A foldable crank 73' for the shaft 72' is swingable from a folded position to cranking position, the same as the crank 73, and by turning the crank 73', when adjusted to its cranking position the wheel 44 may be moved from a transport position corresponding to the transport position of the wheel 43 shown in Fig. 4, into an elevated position above the ground, corresponding to the elevated position of the wheel 43 shown in Fig. 2. Reversely, the wheel 44 may be lowered from its elevated into its transport position by rotating the crank 73' in the opposite direction.

Referring to Fig. 4, the arm 56 has an ear 74 to which a brace 76 is pivotally connected by means of a pivot pin 77. Rigidly secured to the plate 10 of the forward frame channel 3 is a lug 78 which has an offset portion, as shown in Fig. 3, and the upper end of the brace 76 extends into the space between the offset portion of the lug 78 and the plate 10. A cap screw 79 extends through a hole in the lug 78 and is threaded into a tapped hole at the upper end of the brace 76. The brace 76, in the position shown in Fig. 4, serves to directly connect a portion of the arm 56 in the vicinity of the stub axle 57 with the forward frame section while the wheel 43 is in its transport position. Upon removal of the cap screw 79 the arm 56 may be rotated by operation of the crank 73 to move the wheel into its elevated position in which it is shown in Fig. 2.

Referring to Fig. 2, it will be noted that another lug 81 is mounted on the front frame at a proper distance from the axis of the shaft 11 to permit connection of the brace 76 with the lug 81 when the wheel 43 is in its elevated position.

Lugs 78' and 81' corresponding to the lugs 78 and 81 are mounted on the rear frame section, and a brace 76' corresponding to the brace 76 is pivotally secured to the supporting arm 56' for the wheel 44, the free end of the brace 76' being connectable with the lug 78' when the wheel 44 is in its transport position, and the brace 76' being connectable with the lug 81' when the wheel 44 is in its elevated position.

A unitary draft structure for transmitting draft to the harrow in its open and closed positions is provided as follows. Referring to Figs. 1 and 2, a beam 82 is pivotally mounted on hangers 83 and 84 depending from the cross members 8 and 13, respectively, of the front frame. The hanger 84 is shown at an enlarged scale in Fig. 10 and consists of a plate which has a cut-out accommodating the front frame channel 3, an upper portion of the plate being welded to the cross member 13 and to the frame channel 3, and a lower portion of the plate projecting below the frame channel 3 having a hole for the reception of a pivot pin 86. The beam 82 consists of channel iron and a pair of ears 87, 88 (see Fig. 6) are welded to the web of the beam 82 and have alined holes for reception of the pivot pin 86. The hanger 83 is shaped and mounted in the same manner as the hanger 84, an upper portion of the hanger 83 being welded to the cross member 8 and to the channel 3 of the front frame, and a depending portion of the hanger 83 having a hole for the reception of a pivot pin 89 shown in Fig. 2. A second pair of ears 91 and 92, shown in Fig. 6, are welded to the web of the beam 82, and the pivot pin 89 passes through alined holes of the ears 91 and 92. It will be noted that the beam 82 is detachably connected by means of the pivot pins 86 and 89 to the front frame section for pivotal movement relative thereto about an axis in horizontal angularly fixed relation to the axis of the disks 14, and that the open side of the channel constituting the beam 82 faces upwardly in the position of the beam as shown in Figs. 1 and 2. Also, before the beam 82 can be hinged to the hangers 83 and 84, it is necessary to raise the wheel 43 to its transport position in which it is shown in Fig. 2.

Welded to the open side of the beam 82 intermediate its ends is a plate 93, a hole in the plate 93 and a hole in the web of the beam 82 being alined for the reception of a bolt 94. The plate 93 has two additional holes 96 and 97 on an arc concentric with the bolt 94, the hole 96 being shown in Fig. 6, and the hole 97 being shown in Fig. 8.

A draft tongue 98 has a rearward portion on top of the plate 93, and the bolt 94 passes through a hole in the rear end of the draft tongue. The draft tongue has another hole for the reception of a bolt 99 which in the position of the draft tongue shown in Figs. 1 and 6 passes through the hole 97 in order to retain the draft tongue in a predetermined angular position relative to the beam 82. Upon loosening of the bolt 94 and withdrawal of the bolt 99 from the hole 97, the draft tongue may be swung around the bolt 94 into a right angle position relative to the beam 82, as shown in Fig. 8, and the bolt 99 may then be passed through the hole 96 in order to secure the draft tongue in the mentioned right angle position relative to the beam 82. In other words, the bolt 94 provides a pivotal connection between a rearward portion of the draft tongue 98 and an intermediate portion of the beam 82 on a pivot axis at right angles to the open side of the beam, and the bolt 99 serves to secure the draft tongue in different angularly adjusted positions about said pivot axis.

Figure 9:
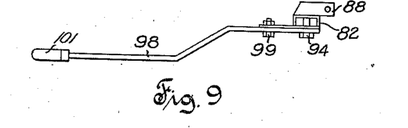
Fig. 9 is a side view of the hitch assembly shown in Fig. 8.

The forward end of the draft tongue 98 has a loop or hitch element 101 for connection to an army truck pintle hook or the like, and it will be noted from Figs. 7 and 9 that the loop 101 is offset relative to the beam 82. That is, the draft tongue 98 has a forward hitch portion at the open side of the beam 82 in transversely offset relation to said open side of the beam. In the position in which the draft structure comprising the beam 82 and draft tongue 98 is shown in Figs. 1, 2 and 7, the hitch element 101 is positioned at a higher level than the beam 82, and it will be seen that the beam 82 may be raised and lowered independently of vertical angular adjustment of the draft structure by mounting the hitch element 101 on a source of draft at a predetermined height above the ground alternatively with one side or the other of the draft structure facing the ground.

Referring to Figs. 3 and 4, the draft structure comprising the beam 82 and draft tongue 98 is shown in these figures as being mounted in an operative position on both of the front and rear tool units. Rigidly secured to the top of the forward frame section is a socket 102 comprising bottom, top and rear portions arranged to provide a space for the reception of the beam 82, the socket being flared at its entrance end which faces toward the left in Figs. 3 and 4, so that the beam 82 may readily be moved into the socket in a horizontal direction from the left in Fig. 4. The top portion of the socket has a hole for the reception of a cap screw 103 which may be threaded into a tapped hole in the bottom portion of the socket. The beam 82 has a hole 104 through which the cap screw 103 may pass when the beam 82 is positioned as shown in Figs. 3 and 4.

A socket 102' corresponding to the socket 102 is rigidly mounted on the rear frame section, and a cap screw 103', corresponding to the cap screw 103, may be passed through a hole 106 of the beam 82 when the harrow is in its closed position and the beam is positioned as shown in Figs. 3 and 4.

In order to prepare the harrow for transporting, the front and rear frame sections are moved from their open to their closed positions while the draft structure is in the position on the front frame section as shown in Fig. 1 and the transport wheels 43 and 44 are in their elevated positions above the ground. All set screws 37, 39, 41 and 42 are drawn up against the bar 22, and the draft structure comprising the beam 82 and draft tongue 98 is removed as a unit from the front frame section by removal of the pivot pins 86 and 89. The draft tongue 98 is adjusted from the position relative to the beam 82, in which it is shown in Fig. 6 to the right angle position relative to the beam 82 as shown in Fig. 8. As stated hereinbefore, the loop 101 is offset toward the open side of the beam 82, and in the position of the hitch assembly shown in Figs. 1 and 2 the open side of the beam 82 faces upwardly. After the pivot pins 86 and 89 have been removed, the hitch assembly is reversed so that the open side of the beam 82 faces downwardly, and in that reversed position the hitch assembly is reinstalled on the harrow in its closed position, as shown in Figs. 3 and 4, and the draft tongue 98, having been adjusted to right angle position relative to the beam 82, then extends at right angles to the shafts 11, 11' and wheel axles 57, 57'. The wheels 43, 44 are lowered from their elevated to their transport positions, whereby the disk gangs 14, 14' are raised a suitable distance above the ground permitting movement of the closed harrow on the transport wheels 43, 44. The braces 76, 76' are adjusted as indicated in Fig. 4.

Tightening of the cap screws 103, 103', after the hitch assembly has been placed into the position shown in Figs. 3 and 4, securely locks the hitch assembly on the front and rear tool units, in vertical and horizontal angularly fixed position so that the draft structure cannot swing vertically, as it can when connected to the front unit only as shown in Figs. 1 and 2. The loop 101 is offset from the beam 82 transversely of the open side thereof a proper distance so that the harrow will be positioned substantially horizontally, as shown in Fig. 4, when the loop is hitched to the pintle hook of an army truck or the like, and so that the loop can be hitched to the same pintle hook for drawing the harrow in open position when the draft structure is mounted in reversed position on the front unit only and the wheels 43, 44 are in elevated position, as shown in Figs. 1 and 2.

The sockets 102, 102' and the cap screw 103, 103' provide means for mounting the draft structure at the ends of the beam 82 in an operative position on the front and rear frame sections while the latter are in the closed position, as shown in Fig. 3, and said mounting means are operable to release the draft structure for movement into a horizontal angularly displaced position relative to the front frame section, as shown in Fig. 1. The hangers 83, 84, the ears 88, 87 and 91, 92 and the pivot pins 86, 89 provide means for releasably securing the draft structure in said angularly displaced position to the front frame section. It will also be noted that the pivot pins 86, 89 and the associated hangers and ears provide means for mounting the beam 82 on the front frame section in angularly fixed relation to the axis of the disks 14, and that the socket 102 and the cap screw 103 provide means for alternatively mounting the beam 82 on the front frame section in a horizontal angularly displaced position relative to said axis, as shown in Fig. 3. The socket 102' and the cap screw 103' provide means for releasably securing the beam 82 in said angularly displaced position to the rear frame section when the frame sections are in the closed position. The beam 82 is of a length permitting it to span the space between the axes of the front and rear disk gangs when the frame sections are closed, as shown in Fig. 3, and the cap screws 103, 103' connect the beam 82 with the frame sections outside of said space. From a comparison of Figs. 1 and 3 it will further be noted that in Fig. 3 the hitch portion 101 lies on a line parallel to and rearwardly of the axis of the disks 14, whereas in Fig. 1 the hitch portion 101 lies forwardly of said axis.

While in the foregoing a preferred embodiment of the invention has been described with reference to the drawings, it should be understood that it is not intended to limit the invention to the exact details of construction herein shown and described, because various modifications within the scope of the appended claims may occur to persons skilled in the art.

It is claimed and desired to secure by Letters Patent:

1. In an earth working implement, a pair of tool supporting frame sections, a transport wheel mounted on one of said frame sections for up and down adjustment relative thereto, another transport wheel mounted on the other of said frame sections for up and down adjustment relative thereto, connecting means between said frame sections affording horizontal angular movement of said one frame section and wheel relative to said other frame section and wheel from a first predetermined position in which said transport wheels are disposed substantially parallel to each other, into a second predetermined position in which said wheels are disposed in relatively diverging planes, a draft structure having a rigid transverse portion and a hitch portion intermediate the ends of said transverse portion for connection with a source of draft, means for operatively mounting said draft structure at said ends of said transverse portion thereof on said frame sections, respectively, when the latter are in said first predetermined position, said mounting means being operable to release said draft structure for movement into an angularly displaced position relative to one of said frame sections, and means for releasably securing said draft structure in said angularly displaced position thereof to said one frame section.

2. In a disking implement of the tandem gang type, a front frame, a rear frame, front and rear disk gangs rotatably mounted, respectively, on said front and rear frames, a transport wheel mounted on said front frame for up and down adjustment relative thereto and for rotation in a plane extending substantially parallel to the axis of rotation of said front disk gang, another transport wheel mounted on said rear frame for up and down adjustment relative thereto and for rotation in a plane extending substantially parallel to the axis of rotation of said rear disk gang, and connecting means between said frames affording a vertical pivot axis about which said frames and wheels may swing from a first predetermined position in which the axes of rotation of said front and rear disk gangs extend substantially parallel to each other into a second predetermined position in which the axes of rotation of said front and rear disk gangs are divergingly disposed relative to each other.

3. In a disking implement, a pair of frame sections angularly movable relative to each other in a horizontal plane, disk gangs rotatably mounted, respectively, on said frame sections, an axle member extending at substantially right angles to the axis of rotation of one of said disk gangs, another axle member extending at substantially right angles to the axis of rotation of the order of said disk gangs, means cooperating with said frame sections and axle members to retain said axle members, independently of each other, in said angular positions relative to the axes of rotation of said disk gangs, said means being operable to adjust said axle members upwardly and downwardly relative to said frame sections, and transport wheels mounted, respectively, on said axle members.

4. In a disking implement, a pair of frame sections angularly movable relative to each other in a horizontal plane, disk gangs rotatably mounted, respectively, on said frame sections, a pair of wheels, an arm supportingly connected with one of said wheels and swingably mounted on one of said frame sections to permit movement of said one wheel relative to said one frame section from a ground engaging transport position in which the plane of said one wheel extends substantially parallel to the axis of rotation of the disk gang on said one frame section, into an elevated position above the ground, another arm supportingly connected with the other of said wheels and swingably mounted on the other of said frame sections to permit movement of said other wheel relative to said other frame section from a ground engaging transport position in which the plane of said other wheel extends substantially parallel to the axis of rotation of the disk gang on said other frame section, into an elevated position above the ground, and means for swingably adjusting said arms, respectively, on said frame sections.

5. In a disking implement, a pair of frame sections angularly movable relative to each other in a horizontal plane, disk gangs rotatably mounted, respectively, on said frame sections, a pair of wheels, an arm supportingly connected with one of said wheels and mounted on one of said frame sections for swinging movement about a pivot axis extending substantially parallel to the axis of said one wheel and at substantially right angles to the axis of rotation of the disk gang on said one frame section, another arm supportingly connected with the other of said wheels and mounted on the other of said frame sections for swinging movement about a pivot axis extending substantially parallel to the axis of said other wheel and at substantially right angles to the axis of rotation of the other of said disk gangs, and means for rotatably adjusting said arms about said pivot axes.

6. A tandem disk harrow comprising a front frame section and a rear frame section carrying front and rear gangs of disks, respectively, means connecting said frame sections with each other for relative swinging movement about a single pivot center from a closed to an open position, and vice versa, a control bar mounted on said frame sections at predetermined distances, respectively, from said pivot center for angular and limited longitudinal displacement relative to said frame sections to determine said open position of the latter, and abutments engageable with opposite end portions of said bar, located on said frame sections, respectively, in predetermined positions so as to contact said end portions of said bar while said frame sections are in said closed position, and so as to be spaced from said end portions of said bar while said frame sections are in said angled position.

7. A tandem disk harrow comprising, a front frame section and a rear frame section carrying front and rear gangs of disks, respectively, means connecting said frame sections with each other for relative swinging movement about a single pivot center from a closed to an open position, and vice versa, a control bar mounted on said frame sections at predetermined distances, respectively, from said pivot center for angular and limited longitudinal displacement relative to said frame sections to determine said open position of the latter, a pair of abutments mounted on said frame sections, respectively, in predetermined positions so as to contact said end portions of said bar while said frame sections are in said closed position, and so as to be spaced from said end portions of said bar while said frame sections are in said open position, and means on one of said frame sections adapted to cooperate with said bar for moving said opposite end portions thereof into predetermined positions relative to said abutments upon swinging movement of said frame sections from said angled into said closed position.

8. A tandem disk harrow comprising, a front frame section and a rear frame section carrying front and rear gangs of disks, respectively, means connecting said frame sections with each other for relative swinging movement about a single pivot center from a closed to an open position, and vice versa, a control bar mounted on said frame sections at predetermined distances, respectively, from said pivot center for angular and limited longitudinal displacement relative to said frame sections to determine said open position of the latter, a pair of abutments mounted, respectively, on said frame sections in predetermined positions, so as to contact opposite end portions of said bar while said frame sections are in said closed position, and so as to be spaced from said end portions of said bar when said frame sections are in said open position, and a guide member mounted in fixed position on one of said frame sections and having an arcuate guide surface engageable with said bar for moving said opposite end portions thereof into predetermined positions relative to said abutments upon swinging movement of said frame sections from said open into said closed position.

9. In a tandem disk harrow, a front and a rear frame section; disk gangs rotatably mounted, respectively, on said frame sections; hinge means connecting said frame sections for relative movement from an open position to a closed position in which the axes of said disk gangs extend parallel to each other, and vice versa, an angle set mechanism affording a vertically rigid connection between said frame sections upon relative movement thereof into said closed position, wheel supports mounted independently of each other on said frame sections for up and down adjustment relative thereto, and transport wheels mounted, respectively, on said wheel supports in position to extend substantially parallel to the axes of said disk gangs upon movement of said frame sections to said closed position and upon adjustment of said wheel supports to a lowered position.

10. In a tandem disk harrow, a front and a rear frame section; disk gangs rotatably mounted, respectively, on said frame sections; hinge means connecting said frame sections for relative movement from an open position to a closed position in which the axes of said disk gangs extend parallel to each other, and vice versa; an angle set mechanism affording a vertically rigid connection between said frame sections upon relative movement thereof into said closed position; and transport wheels mounted, respectively, on said frame sections for up and down adjustment relative thereto in planes extending, respectively, parallel to said axes of said disk gangs.

11. In a tandem disk harrow, a front and a rear frame section; disk gangs rotatably mounted, respectively, on said frame sections; hinge means connecting said frame sections for relative movement from an open position to a closed position in which the axes of said disk gangs extend parallel to each other, and vice versa; an angle set mechanism affording a vertically rigid connection between said frame sections upon relative movement thereof into said closed position; crank arms mounted, respectively, on said frame sections for up and down swinging movement relative thereto about pivot axes extending at right angles, respectively, to the axes of said disk gangs; transport wheels mounted respectively, on said crank arms for rotation about axes extending parallel, respectively, to said pivot axes; and worm and gear mechanisms for adjusting said crank arms about said pivot axes, mounted on said frame sections, respectively.

12. In a tandem disk harrow, a front and a rear frame section; disk gangs rotatably mounted, respectively, on said frame sections; hinge means connecting said frame sections for relative movement from an open position to a closed position in which the axes of said disk gangs extend parallel to each other, and vice versa; an angle set mechanism affording a vertically rigid connection between said frame sections upon relative movement thereof into said closed position; crank arms mounted, respectively, on said frame sections for up and down swinging movement relative thereto about pivot axes extending at right angles, respectively, to the axes of said disk gangs; transport wheels mounted, respectively, on said crank arms for rotation about axes extending parallel, respectively, to said pivot axes; worm and gear mechanisms for adjusting said crank arms about said pivot axes, mounted on said frame sections, respectively; and means independent of said worm and gear mechanisms, for locking said crank arms upon adjustment thereof by said worm and gear mechanisms to raised and lowered positions.

13. In a tandem disk harrow, a front and a rear frame section; disk gangs rotatably mounted, respectively, on said frame sections; hinge means connecting said frame sections for relative movement from an open position to a closed position in which the axes of said disk gangs extend parallel to each other, and vice versa; an angle set mechanism affording a vertically rigid connection between said frame sections upon relative movement thereof into said closed position; a pair of arms having pivot centers, respectively, on said frame sections; a pair of wheels rotatably mounted, respectively, on said arms and movable, upon movement of said frame sections to said closed position, in unison with said arms about said respective pivot centers thereof from an elevated to a lowered position in which said wheels extend substantially parallel to the axes of said disk gangs; brace members of predetermined lengths connected, respectively, with said arms at predetermined distances from said respective pivot centers of said arms; means on said frame sections, respectively, at predetermined distances from said pivot centers for connecting said brace members thereto upon movement of said wheels to said elevated position; and means on said frame sections, respectively, at predetermined distances from said pivot centers for connecting said brace members thereto upon movement of said wheels to said lowered position.

14. In a disk harrow of the type in which a pair of frame sections carrying gangs of disks, respectively, are hingedly connected with each other for relative horizontal movement into open and closed positions, an angle set mechanism comprising a horizontal control bar, a pair of transverse stop members connected with and projecting from said bar at longitudinally spaced portions, respectively, of the latter, means adjustably mounting said bar on said frame sections including a pair of brackets mounted, respectively, on said frame sections and guidingly embracing said bar intermediate said stop members, said brackets being abuttable, respectively, with said stop members upon relative movement of said frame sections to determine said open position of the latter, and a pair of abutments mounted in fixed positions, respectively, on said frame sections and movable into engagement with said bar upon relative movement of said frame sections, so as to determine said closed position of the latter.

15. In a disk harrow of the type in which a pair of frame sections carrying gangs of disks, respectively, are hingedly connected with each other for relative horizontal movement into open and closed positions, an angle set mechanism comprising a horizontal control bar, a pair of transverse stop members connected with and projecting from said bar at longitudinally spaced portions, respectively, of the latter, a pair of guide brackets mounted, respectively, in fixed positions on said frame sections and guidingly embracing said bar intermediate said stop members, said brackets being abuttable, respectively, with said stop members upon relative movement of said frame sections, to determine said open position of the latter, and each of said brackets having relatively converging side portions at opposite sides of said bar to accommodate horizontal angular displacement of said bar relative to said frame section when the latter are moved from said open to said closed position.

16. In a disk harrow of the type in which a pair of frame sections carrying gangs of disks, respectively, are hingedly connected with each other for relative horizontal movement into open and closed positions, an angle set mechanism comprising a horizontal control bar, a pair of transverse stop members connected with and projecting from said bar at longitudinally spaced portions, respectively, of the latter, a pair of guide brackets mounted, respectively, in fixed positions on said frame sections and guidingly embracing said bar intermediate said stop members, said brackets being abuttable, respectively, with said stop members upon relative movement of said frame sections, to determine said open position of the latter, and each of said brackets having relatively converging side portions at opposite sides of said bar to accommodate horizontal angular displacement of said bar relative to said frame sections when the latter are moved from said open to said closed position, and releasable locking means between said brackets and said bar for securing the latter against longitudinal displacement relative to said frame sections.

17. In a disk harrow of the type in which a pair of frame sections carrying gangs of disks, respectively, are hingedly connected with each other for relative horizontal movement into open and closed positions, an angle set mechanism comprising a horizontal control bar, a pair of transverse stop members connected with and projecting from said bar at longitudinally spaced portions, respectively, of the latter, a pair of guide brackets mounted, respectively, on said frame sections and guidingly embracing said bar intermediate said stop members, said brackets being abuttable, respectively, with said stop members, upon relative movement of said frame sections, to determine said open position of the latter, a pair of abutments mounted in fixed positions, respectively, on said frame sections and movable into engagement with said bar upon relative movement of said frame sections, to determine said closed position of said frame sections, and releasable locking means between said abutments and said bar for securing the latter against longitudinal displacement relative to said frame sections.

18. In a disk harrow of the type in which a pair of frame sections carrying gangs of disks, respectively, are hingedly connected with each other for relative horizontal movement into open and closed positions, an angle set mechanism comprising a horizontal control bar, a pair of transverse stop members connected with and projecting from said bar at longitudinally spaced portions, respectively, of the latter, a pair of guide brackets mounted, respectively, on said frame sections and guidingly embracing said bar intermediate said stop members, said brackets being abuttable, respectively, with said stop members upon relative movement of said frame sections, to determine said open position of the latter, releasable locking means between said brackets and said bar for securing the latter against longitudinal displacement relative to said frame sections, a pair of abutments mounted in fixed positions, respectively, on said frame sections and movable into engagement with said bar upon relative movement of said frame sections, to determine said closed position of the latter, and releasable locking means between said abutments and said bar for securing the latter against longitudinal displacement relative to said frame sections.

19. In a tandem disk harrow, front and rear frame sections carrying front and rear gangs of disks, respectively, hinge means connecting said frame sections for relative horizontal movement, and an angle set mechanism comprising a bracket having rearwardly diverging side walls rigidly mounted on said front frame section, another bracket having forwardly diverging side walls rigidly mounted on said rear frame section, a control bar extending through said brackets between said diverging side walls thereof, a transverse stop member connected with said bar forwardly of said first mentioned guide bracket, and another stop member connected with said bar rearwardly of said other bracket, said brackets being abuttable, respectively, with said stop members, upon relative movement of said frame sections to determine said open position of the latter.

20. In an earth working implement of the folding gang type, comprising a pair of frame sections connected for horizontal angular movement relative to each other, and earth engaging tool units operatively mounted, respectively, on said frame sections, the combination of a draft structure having a rigid transverse portion and a hitch porton intermediate the ends of said transverse portion for connection with a source of draft, means for mounting said draft structure at said ends of said transverse portion thereof in an operative position on said frame sections while the latter and said draft structure are positioned in a predetermined angular relation to each other, said mounting means being operable to release said draft structure for movement from said operative position into an angularly displaced position relative to one of said frame sections, and means cooperable with said transverse portion of said draft structure for releasably securing the latter in said angularly displaced position thereof to said one frame section.

21. In an earth working implement of the folding gang type, comprising a pair of frame sections connected for horizontal angular movement relative to each other, and earth engaging tool units operatively mounted, respectively, on said frame sections, the combination of a draft structure having a forward hitch portion for connection with a source of draft and coupling portions rearwardly of and at opposite sides of said hitch portion, means for mounting said draft structure at said coupling portions thereof in an operative position on said frame sections while the latter and said draft structure are positioned in a predetermined angular relation to each other, said mounting means being operable to release said draft structure for movement from said operative position into a horizontal angularly displaced position relative to one of said frame sections, and means for releasably securing said draft structure in said angularly displaced position thereof to said one frame section in vertically swingable relation to the latter.

22. In an earth working implement of the folding gang type comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a draft structure having a forward hitch portion for connection with a source of draft and a transverse portion rearwardly of and in vertically rigid relation to said hitch portion, means for operatively mounting said draft structure at said transverse portion thereof on said frame sections in horzontally fixed and vertically rigid relation thereto when said frame sections are in said closed position, said mounting means being operable to release said draft structure for movement into a horizontal angularly displaced position relative to one of said frame sections, and means for releasably securing said draft structure in said angularly displaced position thereof to said one frame section in vertically swingable relation thereto.

23. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a draft structure having a forward hitch portion for connection with a source of draft and a rigid transverse portion rearwardly of and in horizontal angularly fixed relation to said hitch portion, means for mounting said draft structure at said transverse portion thereof in a operative position on said frame sections while the latter are in said closed position and said hitch portion lies on a line parallel to and rearwardly of the axis of one of said tool units, said mounting means being operable to release said draft structure for movement from said operative position into an angularly displaced position relative to the frame section carrying said one tool unit, with said hitch portion lying forwardly of the axis of said one tool unit, and means for releasably securing said draft structure in said angularly displaced position on said one frame section.

24. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by the proximity to each other, the combination of a draft structure having a forward hitch portion for connection with a source of draft and a rigid transverse rearward portion of a length permitting said transverse portion to span the space between the axes of said tool units when said frame sections are in said closed position, means for operatively mounting said draft structure at said tranverse portion thereof on said frame sections at points outside of said space when said frame sections are in said closed position, said mounting means being operable to release said draft structure for movement into an angularly displaced position relative to one of said frame sections, and means for releasably securing said draft structure in said angularly displaced position thereof to said one frame section.

25. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a draft structure having a rearward transverse portion and a forward hitch portion intermediate the ends of said transverse portion in vertically rigid relation to the latter for connection with a source of draft, separable coupling means between said ends of said transverse portion and said frame sections, respectively, for operatively mounting said draft structure on said frame sections while the latter are in said closed position, a pair of axially aligned pivot brackets mounted on one of said frame sections at points spaced longitudinally of the axis of the tool unit carried by said one frame section, and separable connections between said transverse portion of said draft structure and said pivot brakets for alternatively mounting said draft structure on said one frame section in vertically swingable relation thereto.

26. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a draft structure having a forward hitch portion for connection with a source of draft and a transverse portion rearwardly of and in vertically fixed relation to said hitch portion, coupling sockets mounted, respectively, on said frame sections, separable connections between said transverse portion of said draft structure and said coupling sockets for securing said draft structure in draft transmitting and vertically rigid relation to said frame sections while the latter are in said closed position, a pair of axially aligned pivot brackets mounted on one of said frame sections at points spaced longitudinally of the axis of the tool unit carried by said one frame section, and separable connections between said transverse portion of said draft structure and said pivot brackets for alternatively mounting said draft structure on said one frame section in vertically swingable relation thereto.

27. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a beam element, means for mounting said beam element on one of said frame sections in angularly fixed relation to the axis of the tool unit carried by said one frame section and for alternatively mounting said beam element on said one frame section in a horizontal angularly displaced position relative to said axis, means for releasably securing said beam element in said angularly displaced position thereof to the other of said frame sections when said frame sections are in said closed position, and a draft tongue operatively connected with said beam element intermediate the ends of the latter.

28. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a beam element, means for mounting said beam element on one of said frame sections in angularly fixed and substantially parallel relation to the axis of the tool unit carried by said one frame section and for alternatively mounting said beam on said one frame section in a horizontal angularly displaced position relative to said axis, means for releasably securing said beam element in said angularly displaced position thereof to the other of said frame sections when said frame sections are in said closed position, a draft transmitting element having a hitch portion connectable with a source of draft, and connecting means between said beam element and said draft transmitting element operable to secure the latter on said beam element in different positions of adjustment relative thereto affording different positions, respectively, of said hitch portion longitudinally of said beam element.

29. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a beam element, means for mounting said beam element on one of said frame sections in angularly fixed and substantially parallel relation to the axis of the tool unit carried by said one frame section and for alternatively mounting said beam element on said one frame section in a horizontal angularly displaced position relative to said axis, means for releasably securing said beam element in said angularly displaced position thereof to the other of said frame sections when said frame sections are in said closed position, a draft tongue having a forward hitch portion for connection with a source of draft, and connecting means between an intermediate portion of said beam element and a rearward portion of said draft tongue operable to secure said draft tongue on said beam element in different positions of angular adjustment relative to the latter.

30. In an earth working implement of the folding gang type, comprising a pair of frame sections carrying rotary earth engaging tool units on horiontal axes, respectively, and means connecting said frame sections for relative movement into an open position in which the axes of said tool units extend horizontally at an angle relative to each other and into a closed position in which said tool units lie horizontally side by side in proximity to each other, the combination of a draft structure having a rearward rigid transverse portion and a forward hitch portion offset from said transverse portion so that the latter may be raised and lowered independently of vertical angular adjustment of said draft structure by mounting said hitch portion on a source of draft at a predetermined height above the ground with one side or the other of said draft structure facing the ground, means for mounting said draft structure at said transverse portion thereof on said frame sections in an operative position, with one side of said draft structure facing downwardly, while said frame sections are in said closed position, said mounting means being operable to release said draft structure for movement from said operative position into an angularly displaced and reversed position relative to one of said frame sections with said one side of said draft structure facing upwardly, and means for releasably securing said draft structure in said angularly displaced and reversed position to said one frame section.

31. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a beam element, means for mounting said beam element, with one side thereof facing upwardly on one of said frame sections in angularly fixed relation to the axis of the tool unit carried by said one frame section and for alternatively mounting said beam element with said one side thereof facing downwardly on said one frame section in a horizontal angularly displaced position relative to said axis, means for releasably securing said beam element in said angularly displaced position thereof to the other of said frame sections when said frame sections are in said closed position, and a draft tongue operatively connected at a rearward portion thereof with said beam element intermediate the ends of the latter, said draft tongue having a forward hitch portion at said one side of said beam element in transversly offset relation to the latter.

32. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a beam element, means for mounting said beam element, with one side thereof facing upwardly on one of said frame sections in angularly fixed relation to the axis of the tool unit carried by said one frame section, and for alternatively mounting said beam element with said one side thereof facing downwardly on said one frame section in a horizontal angularly displaced position relative to said axis, means for releasably securing said beam element in said angularly displaced position thereof to the other of said frame sections when said frame sections are in said closed position, a draft tongue having a longitudinally extending rearward portion adjacent to an intermediate portion of said beam element in parallel relation to said one side of the latter and a forward hitch portion in transversely offset relation to said one side of said beam element, and connecting means between said rearward portion of said draft tongue and said intermediate portion of said beam element operable to secure said draft tongue on said beam element in different positions of angular adjustment relative to the latter.

33. In an earth working implement of the folding gang type, comprising a pair of frame sections carrying rotary earth engaging tool units on horizontal axes, respectively, and means connecting said frame sections for relative movement into an open position in which the axes of said tool units extend horizontally at an angle relative to each other and into a closed position in which said tool units lie horizontally side by side in proximity to each other, the combination of a beam element, means for mounting said beam element, with one side thereof facing upwardly, on one of said frame sections in angularly fixed relation to the axis of the tool unit carried by said one frame section and for alternatively mounting said beam element with said one side thereof facing downwardly on said one frame section in a horizontal angularly displaced position relative to said axis, means for releasably securing said beam element in said angularly displaced position thereof to the other of said frame sections when said frame sections are in said closed position, a draft tongue having a rearward portion adjacent to an intermediate portion of said beam element and a forward hitch portion in transversely offset relation to said one side of said beam element, pivotal connecting means between said rearward portion of said draft tongue and said intermediate portion of said beam element on a pivot axis at right angles to said one side of said beam element permitting angular adjustment of said draft tongue relative to said beam element, and means for securing said draft tongue in different angularly adjusted positions about said pivot axis.

JOHN F. BRUNDAGE.

REFERENCES CITED

The following references are of record in the file of this patent:

UNITED STATES PATENTS

| Number | Name | Date |
| --- | --- | --- |
| Re. 20,967 | Rapp | Jan. 3, 1939 |
| 2,325,838 | Dyrr | Aug. 3, 1943 |
| 2,114,540 | Taylor | Apr. 19, 1938 |
| 2,164,963 | Taylor | July 4, 1939 |
| 2,109,098 | Baxter | Feb. 22, 1938 |
| 2,141,805 | White | Oct. 27, 1938 |
| 2,164,550 | Steward | July 4, 1938 |
| 255,934 | Burger | Apr. 4, 1882 |
| 405,005 | Booth | June 11, 1889 |
| 2,266,819 | Seaholm | Dec. 23, 1941 |
| 1,014,038 | Beymer | Jan. 9, 1912 |
| 1,711,485 | Bergeland | May 7, 1929 |

FOREIGN PATENTS

| Number | Country | Date |
| --- | --- | --- |
| 160,350 | Great Britain | 1921 |

Certificate of Correction

Patent No. 2,421,772.                                                                                                          June 10, 1947.

JOHN F. BRUNDAGE

It is hereby certified that errors appear in the printed specification of the above numbered patent requiring correction as follows: Column 11, line 51, claim 3, for "order" read *other*; column 17, line 23, claim 22, for "horzontally" read *horizontally*; line 48, claim 23, for "a operative" read *an operative*; line 70, claim 24, strike out "the" after "by" and insert instead *side in*; column 18, line 37, claim 25, for "brakets" read *brackets*; column 20, line 59, claim 31, for "transversly" read *transversely*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.*